C. E. SINGLETARY.
ACCOUNT BOOK.
APPLICATION FILED FEB. 3, 1919.

1,316,114.

Patented Sept. 16, 1919.
2 SHEETS—SHEET 1.

C. E. SINGLETARY.
ACCOUNT BOOK.
APPLICATION FILED FEB. 3, 1919.

1,316,114.

Patented Sept. 16, 1919.
2 SHEETS—SHEET 2.

UNITED STATES PATENT OFFICE.

CHARLES E. SINGLETARY, OF CHICAGO, ILLINOIS.

ACCOUNT-BOOK.

1,316,114.   Specification of Letters Patent.   Patented Sept. 16, 1919.

Application filed February 3, 1919. Serial No. 274,623.

*To all whom it may concern:*

Be it known that I, CHARLES E. SINGLETARY, a citizen of the United States, residing in Chicago, in the county of Cook and State of Illinois, have invented certain new and useful Improvements in Account-Books, of which the following is a specification.

My invention relates to account books and has for its primary object the provision of an improved account book embodying an improved arrangement and construction whereby the billing of installment accounts, at periodic intervals, may be facilitated and rendered accurate. A further object of the invention is the provision of means whereby, in connection with the periodic billing of a customer, there may be sent to him periodically, successively and without duplication if desired, a consecutive series of follow-up collection letters. Another object is the provision of an improved ruling for account books whereby the number, account, and date of successive installment payments may be shown in close relation to collection letter indicia and regularly arranged date entries whereby the bookkeeper may ascertain with great facility how long a given installment payment is past due and which letter in the series of collection letters should be sent to the customer. A still further object is the provision of an account book having the above mentioned advantages and, while retaining said advantages capable of being altered in arrangement to conform to any change in the particular date on which installment payments are to be made.

Other objects and advantages of my invention will appear from the following description, taken in conjunction with the accompanying drawings which form a part of this specification and illustrate a preferred embodiment of the invention.

In the drawings:

Figure 1 is a plan view of a superposed series of ledger leaves which when bound together form the account book of the present invention.

Fig. 2 is a front edge elevation of the set of leaves shown in Fig. 1.

Fig. 3 is a plan view of a single leaf from my improved account book showing the entries therein and illustrating by that means the operation thereof.

My invention is of use particularly in those mercantile establishments where goods are sold on the installment plan to be paid for by periodic installment payments. In such establishments it is found desirable to make use of a series of collection letters each successive one being preferably of a more insistent character than the one preceding, these letters being sent out periodically to those customers whose installment payments become past due. In the operation of such a system, and in addition to the ordinary book account showing the number of payments, their amount, and the dates on which they were made, it becomes necessary to provide such an arrangement of entries on the ledger page of each customer as will enable the bookkeeper to ascertain readily the date on which the next collection letter should be sent and just what letter of the series is proper to mail to the customer; it is also necessary to provide means for selecting from an account book containing one or two thousand accounts only the leaves of those customers whose accounts require attention on a given date.

Fig. 3 illustrates a representative account. Each customer's account is normally given a serial number and the leaves bearing the various accounts are arranged in the account book in numerical order according to these serial numbers, this arrangement rendering it possible at any time to turn to any given account in the book. Reference numeral 99 indicates generally the ledger leaf of my improved account book. In the particular system herein described installment payments are due one month apart and, when an account becomes past due, collection letters are to be sent out ten days apart until the past due installment is paid. As far as possible this system ignores the fact that some months contain thirty-one days and February less than thirty-one, the system being operated as nearly as practicable on the basis of thirty days to the month. Along one edge preferably the lower edge of each leaf 99 is printed a series of numbers in sets, these sets being designated for convenience of description by numerals 101 to 110 inclusive. Each set comprises three figures representing three dates exactly ten days apart in a month, thus set 101 comprises the numerals 1, 11, and 21; set 102 the numerals 2, 12, and 22; set 103 the numerals 3, 13, and 23; and so on up to set 110 which comprises the numerals 10, 20, and 30. Thus every day in the month is included in the series of sets 101 to 110 inclusive but these dates are arranged so that only those exactly ten days apart are included in each set. Obviously a customer may open his account on any one of the thirty days of the month, and for the sake of uniformity I prefer to consider that an account actually opened on the 31st of the month is for business purposes opened on the first of the next month. Obviously in each month there are ten sets of three dates each wherein the dates in each set are ten days apart. Therefore, in the making up of my improved account book, I provide ten different forms of the ledger leaf 99. In a complete group of ten ledger leaves there will be one leaf provided with a protruding lower edge tab, 111, this tab bearing the numeral 1 and protruding from the lower edge of the leaf in juxtaposition to set 101 of the month dates; there will also be a ledger leaf carrying a similar tab 112 which bears the numeral 2 and projects from its leaf in juxtaposition to set 102 of the month dates. Other leaves to the aggregate of ten are provided each having a similar tab, these tabs being designated by reference numerals 113 to 120 respectively and the tabs being consecutively numbered to 10 as illustrated in Fig. 1. The tab marked 4 projects from its separate ledger leaf in juxtaposition to the set of month dates 104 indicating the 4th, 14th and 24th days of the month, the tab marked 5 is similarly arranged on a separate leaf with respect to set 105 of the month dates and so on to tab 120 which bears the numeral 10 and projects from its separate ledger leaf 99 in juxtaposition to the set 110 of month dates indicating the 10th, 20th and 30th days of the month. As illustrated in Fig. 2 the various tabs will be often duplicated in a book containing many accounts, but all the tabs numbered alike will be arranged one beneath the other so that all the tabs 111 are vertically alined in the book, all the tabs 112 are vertically alined and so on.

Leaf 99 is horizontally ruled by lines 121 over nearly the whole of its surface. One of these horizontal lines numbered 122 is preferably made double or very heavy in order to divide the page into upper and lower portions, while a similar double line 123, vertically disposed, divides the page roughly into left and right sections. The left hand part of the upper portion is given the reference numeral 124 and in it are preferably set forth such personal data as may be necessary regarding the customer and the persons through whom the goods were sold to him. The right hand end of the upper portion bears reference numeral 125 and in it are set forth the particular terms of the contract of sale. A short double horizontal line 126 slightly spaced above line 122 sets off the lower portion of part 125 for entry of the date and amount of the first cash payment down and the name of the collector receiving the same if it be desired to include that collector's name. That portion of the page included between its right hand edge, the lower line 121, double line 123, and double line 126 is vertically ruled to provide month, date, year, and amount columns and, if desired, another column for the names of the various collectors receiving installment payments from the customer in case the customer pays to a collector instead of through the normal channel of the mails; or to indicate the character of each remittance, whether check, draft, postoffice or express money order, or cash. In the month, day and year columns are set down the month, day of the month and year in which the various payments are made and the amount of the payment is in each instance set down in the amount column.

Left of line 123 the left hand part of the lower section of the page is vertically ruled to provide a series of vertical columns of spaces. These spaces are provided with indicia beginning at line 123 and proceeding successively to the left therefrom. These columns for convenience in description will be termed letter columns to distinguish them from the month, date, year and amount columns just described as being positioned to the right of line 123. These letter columns may be headed by any desired series of indicia, those shown being "A," "B," "C," "A²," "D," "E," "F," "G," "H," "I" and "K." These indicia comprise an arbitrary set of index characters adopted to designate eleven different collection letters or communications employed in inducing customers to pay their installments promptly. If desired letter column A may be vertically subdivided to provide a pair of narrow vertical columns within itself and just to the left of line 123. As it is seldom necessary to use the entire lower left hand area of the ledger leaf in the collection of a single account, a portion of this area may be ruled off by a horizontal heavy line 127 for insertion of such miscellaneous data relative to correspondence as may be useful, or according to the requirements of any given business this area for miscellaneous correspondence memoranda may be greatly reduced or omitted altogether, in which latter instance the letter columns will occupy approximately the entire lower left hand area of the leaf.

In Fig. 3. we find the entries made in a representative account, that is in an account taken at random from many thousands of others. The serial number of the account is 475 as appears on an upper line in part 125. The article sold is a book, indicated by the legend "L of H," the price of the book is set forth as $14.50. The installment payments are to be $2.00 each month as indicated, the account beginning in January and the installment payments being due the 11th of each succeeding month. The name of the customer is John Doe and, as indicated to the right of line 123 and between lines 122 and 126, he made an initial cash payment of $2.50 on the 11th day of January in the year 1918. Attention is here directed to the fact that all entries below the horizontal double line 122 have reference to the collection of the installment payments following the initial cash payment so that all of the transactions and memoranda relative to the work of collecting the unpaid portion of the account are gathered conveniently in one section of the account page. Near the top of letter column A in Fig. 3 and to the right of the designated index A will be found the letters VL followed by the date, "1—15." This indicates that a verification letter acknowledging receipts of the contract and the initial cash payment was sent to John Doe on the 15th of January. Following the initial cash payment John Doe should have made his next payment on the 11th of February according to the terms of his contract. Inasmuch as the bills, collection letters, and payments in these installment contracts are generally conveyed through the mails it is the normal custom of the selling firm to place its bills and collection letters in the mail five days before the day on which payment is due or on which it is desired to request payment of a past due account. In letter column A the first entry directly under the index character A in this instance denotes a bill reminding John Doe that on the 11th of February he should pay to the selling firm an installment of $2.00. This bill, according to the system being followed, was sent out five days ahead of time, that is on February 6th. The installment due February 11th was not paid on time and as a result a collection letter designated by index character B was sent him on February 16th to arrive in his hands on or before the 10th day after February 11th. From the entries to the right of column 123 we find that the firm on February 21, 1918 received a payment of $2.00 from the customer John Doe. This payment having been made, the next payment was due on March 11, 1918. Referring again to column A we find that a bill for this next installment was sent to the customer on March 6th, five days before the payment was due. Payment was not received on March 11th and, as indicated in the second horizontal line of spaces below line 122 it was necessary to send the consecutive collection letters B, C, A², and D to the customer before he made the third payment of $2.00 on April 21, 1918, as indicated to the right of line 123 in that same horizontal line of spaces. The customer was at that time more than a month behind in his installment payments and therefore, on April 26, as indicated in letter column A, a bill was sent him for the installment due April 11th. The customer made the payment of $2.00 due April 11th, on May 1st, 1918, as indicated to the right of line 123 on the third horizontal line below line 122. Inasmuch as the next installment payment was due on the 11th of May, a bill for that installment was mailed to him five days beforehand, that is on May 6th, as shown in letter column A on the fourth line below line 122. The six entries on this same horizontal line to the left from "5—6" indicate that six successive collection letters were required to be sent ten days apart to John Doe before he was induced to make the payment of $2.00 which was due on the 11th of May. After mailing collection letter F to him on the 6th of July, the firm received on July 11th another installment of $2.00 from the customer. On the 16th of July he was billed for the next to the last installment and paid it on the 21st of July as indicated to the right of line 123 on the fifth line below line 122. Ten days after the bill of July 16th, namely on July 26th, the firm mailed John Doe a bill for the last installment. This last installment should have been paid on July 11th and was now past due. As no payment was made within ten days after the mailing of the last bill on July 26th, and as the customer was now familiar with collection letters B, C, A², D, E, and F, the firm at the end of ten days, namely on August 6th, mailed him collection letter G and followed it ten days later, on August 16th, with collection letter H, these last two collection letters being in the ordinary course of business more insistent in urging payment than any of the previous letters received by this customer. The result as indicated by the account, was that on August 22nd, 1918, John Doe made his final payment of $2.00 completing his remittances to the firm for the book purchased.

Inasmuch as the account of John Doe was opened by his initial cash payment on the 11th of January his account was opened upon a ledger leaf having the tab numbered 6, it being necessary to handle the account in the office of the firm five days before the 11th of each month when the installment payments were due. It is customary in making up installment account books to carry a thousand or more accounts in one loose leaf binder, and with such a large number of accounts in each book it becomes essential for the bookkeeper or other employee sending out bills and collection letters to be able to select from the thousand or more accounts only those requiring handling on any given date. It will be observed that, with the exception of the verification letter sent to John Doe, all the other dates in the letter columns of his account are either the 6th, 16th or 26th of the month. By means of the tab 116 the bookkeeper handling collections may on the morning of the 6th, 16th or 26th of the month select from an account book only those accounts requiring bills or collection letters on those three dates. Assuming that the bookkeeper begins work on the 16th of the month and wishes to mail out bills or collection letters only to those accounts necessary to be handled on that day, he glances along the sets of month dates 101 to 110 inclusive on the first account in the book until he comes to the date 16 which he finds to be juxtaposed to tab 116 which is numbered "6." Thus he learns that the only accounts which he needs to handle are to be found on ledger leaves bearing the tab numbered 6. Upon opening the account book to the account of John Doe—which account he has located by its tab numbered 6—it is to be noted that he learns from the letter columns in the account three pieces of information, that John Doe is due on the 16th of the month to receive a bill; or that the customer is due on the 16th of the month to receive instead of a bill a collection letter; and, in addition to that, he learns from the date entries in the letter columns precisely what collection letter should be sent. Let us assume that the bookkeeper opens to John Doe's account on May 16th, 1918. Glancing at letter column A he finds that a bill for the payment due May 11th was sent to the customer on the 6th of May. He thereupon prepares for mailing collection letter B and posts the date "5—16" in letter column B on the fourth line below double line 122. Inasmuch as the customer is not on this date very long past due in his installment payment the succeeding date entries to the left in columns C to F inclusive show that a regular succession of collection letters were sent to the customer even though he had previously received letters B, C, A² and D. After posting the entry "5—16" as just described the account shows that the bookkeeper selected the John Doe account from the entire book on five separate dates ten days apart, using the sets of month dates along the lower margin of the top leaf on the 26th of May, the 6th of June, the 16th of June, the 26th of June, and the 6th of July, for the purpose of locating the tab marked 6. Having determined on each of these dates from the topmost leaf in the account book what tab indicated the desired accounts he selected in the account book only those accounts placed on leaves having the tab marked 6 and in that way eliminated all the other accounts and at each ten day period, along with others, attended to the John Doe account. As above described therefore when the bookkeeper on the 16th of May turned to the John Doe account the sets of month dates along the lower margin directed him to the tab marked 6; the tab marked 6 directed him to the John Doe account among others, and the entries in the letter columns gave him the information that, not a bill, but collection letter B should be sent to John Doe.

Let us assume now that on the 16th of July, 1918, the bookkeeper opens to the John Doe account. The information he now receives from the account is that on the 11th of July the customer made an installment payment of $2.00. By glancing down the letter columns and noting the seven date entries on the fourth horizontal line below line 122 he learns instantly that the last payment is not the only payment past due but was the payment due on May 11th; and he also learns that the payment due on June 11th is still past due. The sum of his information gained from the account on the 16th of July therefore is that a bill for this past due installment should be mailed to the customer and he consequently prepares such a bill for mailing and makes the entry "7—16" in letter colmun A on the fifth line below line 122. Ten days later, on the 26th of July, the months dates and tab marked 6 again direct the bookkeeper to the John Doe account from which he learns that the payment due on June 11th was received from the customer on July 21st. The payment due July 11th however is also past due and again the bookkeeper is informed from the state of the account that a bill for this past due payment should go to the customer: he therefore prepares such a bill and makes the entry "7—26" on the sixth line below line 122. After another ten day period has passed, namely on the 6th of August, the bookkeeper turns to the John Doe account and finds that no response has been received from the bill mailed July 26th. He notes that the account has three times become past due and that it is advisable for that reason to send John Doe a collection letter of more insistent character than any which that customer has so far received. He therefore prepares collection letter G for mailing to John Doe and makes the entry "8—6" in letter column G on the fifth line below line 122. After another ten days the bookkeeper notes from the John Doe account that the final payment has not been made and he mails collection letter H, making the entry "8—16" in letter colmun H on the fifth line below line 122. On both the 6th and 16th of August therefore the information gained through the use of the month dates along the lower margin of the account book, the tabs marked 6, the letter columns, and the amount column was that very strong collection letters should be sent to John Doe and that those collection letters to be sent were respectively letters G and H.

A fourth piece of information is obtainable from the arrangement of ruling of the present invention. Looking at Fig. 3 it will be seen that there is no entry of the date of February 26th in the letter columns. The information conveyed to the bookkeeper on that date was that no action was necessary on that date in the John Doe account, for following the mailing of collection letter B on February 16th the customer had, on February 21st, paid the $2.00 installment due on February 11th and the next installment was not due until March 11th; for this March 11th installment no bill was required to be mailed to John Doe until March 6th, five days before the installment was due, therefore there was no bill or collection letter to go to this customer on February 26th.

A further feature of utility of the present invention is its flexibility with respect to changes in the date on which installment payments are due. As frequently occurs, it may happen that the customer John Doe will write in to the firm requesting that the due date in each month for his installment be changed from the 11th to the 6th of the month. This change, if approved by the firm, would require that his account be handled three times each month, namely on the first of the month which is five days before the 6th, and at the end of the two succeeding ten day periods; namely the 11th and 21st. To re-copy all the entries in the John Doe account on to another ledger leaf carrying tab 111 bearing the numeral 1 would occasion a great loss of time. I provide therefore that the tab 116 may be cut off of the leaf 99 shown in Fig. 3 along the dotted line 128, and another tab marked 1 attached to the John Doe account in juxtaposition to set 101 of month dates, as indicated in the dotted lines in the lower right hand corner of Fig. 3 Any one of the tabs may in similar manner be cut from a partly completed account and a tab bearing a different numeral attached to the leaf opposite the proper set of month dates. Instead of applying a numeral to each tab 111 to 120, the sets of month dates may be indicated on the respective tabs by any convenient or arbitrary set of marks.

It will be noted that each of the vertical columns on the ledger sheet is provided at its upper end with a legend indicating to what the numerals placed in the columns pertain. It will also be seen that all of the collection letters sent out in inducing a given collection are horizontally alined with the amount of the ultimate collection, and the date on which the remittance was received. These vertical and horizontal lines of entries together with the legend placed on the vertical columns, constitute an arrangement by means of which three other important objects of the invention are attained, namely, to ascertain which letters are most productive of prompt payments; in other words, the pulling power of any given letter; the cost of the various collections; and the ready determination of those seasons of the year in which money is most easily collected.

In going over a large number of accounts, the bookkeeper, by a quick glance at the entries to the left of line 123, can tell which collection letters in the series have resulted in prompt payments. He can add in separate columns the number of collection letters which have resulted in prompt remittances, and the resulting footings will indicate instantly which collection letter of the series has had the quickest effect upon the customers. For instance, in the account shown in Fig. 3, the billing letter "A" twice resulted in prompt collections; collection letter "B" produced one prompt collection; letter "D" produced another; "F" another and "H" the last. As far as may be determined from the record therefore, collection letters "B" "D" "F" and "H" had greater pulling power than letters "C", "A²" "E" and "G". By comparing the number of letters resulting in prompt payments from a large number of accounts, the manager of a collection department can very accurately arrive at the remittance inducing power of the various letters, and this information will enable him to eradicate from the series of letters one which is found to be weak, or warn him that the weak letter needs revising.

The firm sending out the series of collection letters herein referred to has, of course, accurate information as to the exact cost of putting each letter in the hand of the customer. In the account shown in Fig. 3, six "A" letters were sent out, three "B" letters, two "C" letters, etc. The vertical alinement of date entries in column "A" enables the collection department of a firm to figure instantly the cost of the "A" letters, the cost of the "B" letters sent to the same customer, the cost of the "C" letters etc., and totaling the cost for each collection letter column, the department arrives readily at the total cost for collecting the installment payments entered in the amount column. If this cost is greatly in excess of the profit on the article sold, the firm will be guided in its future business with that particular customer. It may also happen that the cost of "C" letters for example, is greater than that for "B" or "D" letters, in which event the "C" letter, being one of the weaker letters, would undoubtedly be withdrawn from the series and its place taken by a letter of greater pulling power. Thus the vertical alinement of dates in the various collection letter columns facilitates the work of determining the whole cost of collecting the installment payments on a given account. The horizontal alinement collection letter entries and the resulting payment enables the ready determination of the cost of any given payment. Looking at Fig. 3 we find that the $2.00 payment sent on April 21, 1918 cost more than the payment received February 21st; that the payment of May 1st was induced at the minimum cost while the payment of July 11th was relatively very expensive in collection. With respect to any given account, this horizontal alinement of dates and payments, may enable the firm to save money in the long run. Should it be found, for example, that the first, second and third installment collections, that is, those of February and April 21st and May 1st, each took five or six collection letters to secure, the firm would instruct its salesmen in that customer's territory to call upon the customer in an effort to induce prompter payments, or a settlement of the whole account at once, which attempt, if successful, would prevent the necessity of further expenditure in sending out eighteen or more further collection letters.

The vertical alinement of the month, date and year entries opposite the respective installment payments, facilitates the determination of those seasons of the year at which collections are most readily induced. For instance, it will be seen from Fig. 3, that during February, March, April and May, only three $2.00 installments were made in the four months, while in July and August, three others were received in two months. The obvious deduction is that John Doe had more money in the summer than in the winter, and a comparison of accounts from that section of the country in which he lives may bear out this fact and show that in that section collections may be expected more readily in summer than in winter. This deduction will control the house as to the time of year in which it sends out its salesmen into that section. A further feature of utility in the determination in that season of the year in which money is paid most readily lies in the ability of the firm to forecast the time when it will have the most money on hand from its collections. Obviously that season of the year is the best in which to buy more surplus stock or to make heavy payments for any particular object, such for example as employing an increased number of salesmen.

I claim:

1. A leaf for account books having sets of numbers along its margin, and a tab projecting from the edge of the leaf in juxtaposition to and appropriately marked for designating one of said sets.

2. A leaf for account books having sets of month dates along its margin, and a tab projecting from the edge of the leaf in juxtaposition to and appropriately marked for designating one of said sets.

3. A leaf for account books having along one margin a series of sets of month dates, the last digit of each numeral of a set being the same figure, and a tab juxtaposed to one of said sets, projecting from the edge of the leaf, and bearing said figures.

4. In an account book, the combination of a plurality of account leaves each having along one margin a series of sets of month dates, said series including the numerals from 1 to 30 designating the days of the month and those dates a given number of days apart being gathered in one set, and a tab on each leaf juxtaposed to one of said sets, projecting from the edge of the leaf, and bearing a mark indicative of the dates in the juxtaposed set.

5. In an account book, a set of ten account leaves each having along its margin a series of consecutive sets of three month dates each, the dates in each set being ten days apart, a tab marked 1 and projecting from one leaf at a point juxtaposed to the first set of month dates, and a similar tab marked 2 projecting from the second leaf in a position juxtaposed to the second set of month dates, and a similar single tab on each of the other leaves of the book each projecting from its leaf and juxtaposed to a different set of month dates.

6. In an account book for use in keeping records of installment accounts wherein payments are due periodically, the combination with a plurality of account leaves, of means whereby the accounts necessary to be handled on a given date may be selected without reference to any of the other accounts, comprising a marginally positioned series of consecutive sets of month dates on each leaf, and a tab projecting from each leaf in a position juxtaposed to the set of month dates including the particular date on which the account on the given leaf is to be handled, said tab bearing a character indicative of the juxtaposed set of month dates.

7. In an account book the combination with a plurality of account leaves, of a consecutive series of sets of month dates printed on each leaf, the sets being vertically alined when the leaves are superposed, and a plurality of tabs one projecting from each of said leaves, each tab being juxtaposed to, and bearing a character indicative of one of said sets of month dates.

8. In an account book, the combination with a plurality of account leaves, of a consecutive series of sets of month dates marginally positioned on each leaf, the dates in each set being a given number of days apart and different from those of any other set, and tabs each provided with one of a consecutive series of characters that are each indicative of one of said sets of month dates, said tabs projecting one from each of said leaves and each tab being in juxtaposition to that set of month dates of which it is indicative; identically marked tabs being alined in the superposed position of said leaves.

9. An account book comprising a plurality of account leaves each having spaced horizontal rulings, vertical rulings across the horizontal rulings forming appropriately designated month day year and amount columns grouped together, and vertical letter columns positioned at one side of said first named columns and partially co-extensive therewith, said letter columns being each headed with one of the characters of a set of indicia indicative of the separate letters of a series of collection letters, the spaces defined by said horizontal rulings and the vertical letter column rulings being each of a size sufficient to contain a day and month notation.

10. An arrangement for account book rulings, comprising horizontal rulings spaced from each other and covering a given area of each leaf of the account book, vertical rulings intersecting said horizontal rulings at one end of each leaf to form appropriately designated month date year and amount columns, and other vertical rulings intersecting the remaining portions of said horizontal rulings to form vertical columns of spaces partially co-extensive with said first mentioned columns, each of said last mentioned vertical columns of spaces being provided with one of the characters of a series of indicia representing the consecutive letters of a progressive series of collection letters.

11. An account leaf ruling comprising vertical appropriately designated month date year and amount columns, grouped together, a series of vertical letter columns grouped together to one side of said month, date year month and amount columns, a progressive series of index characters arranged one at the head of each of said letter columns and a horizontal ruling crossing said month date year amount and letter columns and dividing said columns into horizontally alined sets of spaces.

12. In a leaf for account books, an arrangement of rulings therefor, comprising a prominent horizontal ruling mediately disposed on the page, a series of vertical letter columns grouped together and extending in one direction from said prominent horizontal ruling, and appropriately designated month date year and amount columns grouped together adjacent to and parallel with said letter columns, said month date year and amount columns being substantially co-extensive with said letter columns and extending slightly to the opposite side of said prominent horizontal ruling from said letter columns, and spaced horizontal rulings crossing said letter columns and said month date year and amount columns to divide them into horizontally alined sets of entry spaces.

13. In an account book, a combination of parts and arrangement of ruling adapted for use in an installment collection system employing a series of different collection letters to be forwarded periodically, comprising a plurality of account leaves, a consecutive series of sets of month dates printed marginally on each leaf, each of said sets including those dates in each month on which collection letters are to be forwarded, a tab protruding from each leaf in juxtaposition to that set of month dates in the series applicable to the particular account contained on the leaf, said tab bearing a character indicative of that set of month dates, a series of parallel columns of entry spaces ruled upon each leaf, each of said columns bearing a character indicative of one of the series of collection letters to be forwarded.

CHARLES E. SINGLETARY.

Copies of this patent may be obtained for five cents each, by addressing the "Commissioner of Patents, Washington, D. C."